Patented Apr. 4, 1933

1,903,319

UNITED STATES PATENT OFFICE

DANIEL M. GRAY, OF WHEELING, WEST VIRGINIA, ASSIGNOR TO HAZEL-ATLAS GLASS CO., OF WHEELING, WEST VIRGINIA, A CORPORATION OF WEST VIRGINIA

LINER FOR RECEPTACLE CLOSURES

No Drawing. Application filed June 13, 1929. Serial No. 370,739.

This invention relates to liners for receptacle closures, and is more especially designed for use with metallic closures intended for glass containers for foods, cosmetics, and other materials having an acid or alkaline content and therefore liable to act upon the metal of the closure.

Liners have been heretofore proposed and patented which were made of paper or similar material, treated with paraffin, rosin, or the like, but such previous structures have not proven entirely satisfactory for the reason that they have failed to meet one or more of the following requirements which are essential to a practical liner.

Useful liners must be free from objectionable taste or odor; they must be incapable of imparting any foreign odor or taste to the contents of the container; they must be clean and attractive in appearance, and must be sufficiently flexible to conform to the "finish" or configuration of the mouth of the container. In addition, a practical liner should be resistant to all food products and many other products commercially packed in glass containers; its cost must be sufficiently low to permit competition with other liners, and it must have a low moisture absorbing coefficient.

The object of the present invention resides in the provision of a composite liner of coated paper or similar material having all of the foregoing characteristics.

In carrying out the invention to attain the foregoing object I employ a sheet of paper, preferably a paper having a sufficient density to reduce to a minimum any permeation thereof by the coating or film to be applied thereto.

The basis of the coating is preferably a synthetic resin produced by the combining of vinyl acetate and vinyl chloride. The proportions of these two compounds and the conditions under which they are polymerized determine the properties of the final product. Such product, however, is usually too hard and too brittle to be employed in a liner and a plasticizing agent is necessary to provide a coating which is sufficiently tough and flexible for the purpose intended.

From a long series of experiments with a large number of plasticizers, I have found that tricresyl phosphate and ethyl abietate are best suited to modify the brittle synthetic resins to a form which is ideal for the manufacture of liners, although other plasticizers such as ethylmetatoluene sulfonamid and ethylparatoluene sulfonamid may be employed. To these plasticized resins I also preferably add a pigment such as a finely ground mixture of titanium oxide and zinc oxide. By the addition of this material the completed liner is given an opaque white appearance which adds to its attractiveness, and in many instances acts in conjunction with the resin to decrease the amount of moisture which the liner is capable of absorbing. While the addition of a pigment is in no sense essential, yet sometimes it is quite desirable that a pigment be employed inasmuch as past experience has conclusively proven that moisture taken up by a liner passes through it to the exterior of the package, and thereby results in a loss of the contents. The synthetic resins described herein have an extremely low moisture absorbing coefficient, and where a pigment is employed with the resin the amount of absorption is often reduced to a negligible quantity, depending to some extent upon the manner in which the ingredients are prepared. As indicative of the low moisture absorbing qualities of the present liner it is to be noted that whereas ordinary oil paper has a moisture absorption of about 14% to 18%, this liner shows a moisture absorption of about only 3%.

In preparing the compound the resin is preferably dissolved in toluene, although other solvents such as ethyl acetate, acetone, etc., may also be employed, or the plasticizer itself may function as a solvent. To the resin concentration which is about 50%, may be added a pigment such as titanium oxide. This pigment is first ground in a suitable medium such as tricresyl phosphate and a solvent such as ethyl acetate, and then introduced together into the resin solution. It is, of course, not essential that the pigment be ground in the plasticizer although this has been found to be the most convenient way of preparing it.

The ingredients as thus brought together are thoroughly mixed and the resultant coating is then ready for application to the paper sheets.

The foregoing compound is odorless and tasteless and is extremely inert to such chemical reagents as caustic soda, as well as acetic acid mixed with ordinary salt, and liners coated with this compound will withstand concentrations of these reagents for several months or more. It is apparent therefore, that the compound is well adapted for liners used in containers for food products, cosmetics and the like.

After the compound is completed as above described, the paper, preferably of a dense texture which reduces permeation to a minimum, is gradually unwound from a roll and passed through the solution of the coating material, thence through a vertical drying tower where it contacts with air at a temperature of about 130° Fahrenheit. The warm air acts to drive the solvents out of the coating solution, and the coated paper then passes into a second tower maintained at a somewhat higher temperature such as 200° Fahrenheit. At this higher temperature the coating substance undergoes certain changes which render it more resistant to chemicals, etc. These temperatures may of course be varied in accordance with the speed at which the paper travels through the drier. The web now passes into a chamber heated to about 260° Fahrenheit, which provides the final baking of the coating material and gives it the prescribed qualities of waterproofness, acid resistance, etc.

Upon the completion of the above process the web of lining material is run through a mechanism which stamps out the liners of the desired diameter and they are then ready for use in a manner which will be readily understood.

The liners as thus produced are relatively thin and light, and have an attractive opaque white appearance. They are sufficiently flexible to conform to the mouth of the containers to be sealed, and are free from objectionable taste or odor. Such liners also impart no foreign taste or odor to the contents of the containers, and are resistant to all food products and many other products, such as salves and the like. In addition, these liners have an extremely low coefficient of moisture absorption and practically insure the retention in the container of the liquids as originally packed.

From the foregoing it will be seen that I have devised a novel liner for jar closures embodying all of the essential characteristics of such devices, that it is of sufficient-low cost to be practicable, and that while it serves to insulate the closure from the contents of the jar its effect on the contents is nil.

I have described herein the preferred embodiment of the invention, as prescribed by the patent statutes, but the broader aspects of the invention are not so limited, and I desire, therefore, that the above description be considered as merely illustrative of the invention, and that the various modifications to which the invention is susceptible be included within the scope of the appended claims.

What I claim as new and desire to secure by Letters Patent is:

1. A liner for closures including a disc of paper of sufficient density to reduce to a minimum any permeation by a coating applied thereto, and a film of coating material applied to said disc, said material comprising an artificial resin composed of polymerized vinyl acetate and vinyl chloride treated with a plasticizing agent.

2. A liner for closures including a disc of paper of sufficient density to reduce to a minimum any permeation by a coating applied thereto, and a film of coating material applied to said disc, said material comprising an artificial polymerized vinyl resin treated with a plasticizing agent.

DANIEL M. GRAY.